United States Patent
Engstrand et al.

(10) Patent No.: US 6,251,180 B1
(45) Date of Patent: Jun. 26, 2001

(54) SHRINKAGE-REDUCING AGENT FOR CEMENT COMPOSITIONS

(75) Inventors: Jens Engstrand, Helsingborg; Carl-Axel Sjögreen, Perstorp, both of (SE)

(73) Assignee: Perstorp AB, Perstorp (SE)

( * ) Notice: Subject to any disclaimer, the term of this patent is extended or adjusted under 35 U.S.C. 154(b) by 0 days.

(21) Appl. No.: 09/402,399

(22) PCT Filed: Mar. 30, 1998

(86) PCT No.: PCT/SE98/00578

§ 371 Date: Oct. 15, 1999

§ 102(e) Date: Oct. 15, 1999

(87) PCT Pub. No.: WO98/45219

PCT Pub. Date: Oct. 15, 1998

(30) Foreign Application Priority Data

Apr. 9, 1997 (SE) .................................................. 9701301

(51) Int. Cl.⁷ ............................. C04B 24/00; C04B 40/00
(52) U.S. Cl. .......................... 106/724; 106/802; 106/819; 106/823
(58) Field of Search .................................. 106/724, 819, 106/823, 802

(56) References Cited

FOREIGN PATENT DOCUMENTS

| 1900202 | * | 8/1970 | (DE) . |
| WO 96/22956 | * | 8/1996 | (WO) . |
| WO 97/01523 | * | 1/1997 | (WO) . |

OTHER PUBLICATIONS

Patent Abstracts of Japan, Abstract of JP A 6–247760 (Kuraray Co. Ltd.), Sep. 6, 1994.
Patent Abstracts of Japan, vol. 13, No. 402, C–633, abstract of JP 1–145357 A (Asahi Glass Co. Ltd.), Jun. 7, 1989.

* cited by examiner

*Primary Examiner*—Elizabeth D. Wood
(74) *Attorney, Agent, or Firm*—Stevens, Davis, Miller & Mosher, LLP

(57) ABSTRACT

Shrinkage-reducing agent intended as additive in aqueous cement comprising compositions. The agent comprises at least one acetal, preferably a cyclic formal, of a tri- or polyhydric alcohol, which acetal comprises at least one 1,3-dioxa group. The acetal has preferably a water solubility of at least 1%. The agent can, in addition to said acetal, comprise at least one amorphous silica, preferably a powderous silica. The invention refers in a further aspect to the use of said agent in said compositions. The agent is, when used, added to said composition in an amount of 0.1–20% by weight.

26 Claims, No Drawings

SHRINKAGE-REDUCING AGENT FOR CEMENT COMPOSITIONS

The present invention relates to a shrinkage-reducing agent intended as additive in aqueous cement comprising compositions, such as a concrete, a hydraulic cement, a screened, a mortar or sealant composition. The agent comprises at least one acetal, preferably a cyclic formal, of a tri or polyfunctional alcohol, which acetal comprises at least one 1,3-dioxa group. The agent can, furthermore, comprise least one amorphous silica, such as a silicic acid. The invention refers in a further aspect to the use of said shrinkage-reducing agent in said compositions.

Additives have for a long time been used to control and/or adjust the properties of mineral based compositions. These additives include porosity adjusting additives, flowability adjusting additives, curing accelerators, curing retardants and the like. The additives can work surface chemically as well as chemically and the various mechanisms involved are not yet fully characterised. Frequently used additives include for instance formaldehyde resins, such as sulphonated naphthlene-formaldehyde resins and sulphonated amino-formaldehyde resins, salts of alkali metals and alkaline earth metals, lignosulphonic acids, silica, polyalcohols, gypsum and similar additives.

Shrinkage, such as dehydration shrinkage, in cement based compositions is today normally controlled by included amount of gypsum. Shrinkage give rise to cracking and other imperfections and other failures, which per se may result in cracking and/or weakened constructions. Optimised formulations, that is controlled shrinkage-reducing effect, means and implies that the ratio gypsum to dry cement must be kept within narrow limits. The risk that the shrinkage-reducing effect turns into a swelling effect increases markedly if for instance too high an amount of gypsum is added. Cement as well as gypsum are natural product and have thus a varying composition making it difficult to batchwise maintain a constant ratio between these. The composition as well as the properties of the final product will accordingly and to a rather large extent vary.

The complexity of above can be illustrated by following exemplification related to initial hydration of Portland cement. The main components of Portland cement are the four clinker minerals tricalciumsilicate ($3\ CaO.SiO_2$), dicalcium silicate ($2\ CaO.SiO_2$) and tricalciumaluminate ($3\ CaO.Al_2O_3$) in an amount of 1–15% and tetracalciumaluminoferrite ($4\ CaO.Al_2O_3.Fe_2O_3$), and minor amounts of magnesium, calcium, sodium, and potassium oxide (MgO, CaO, $Na_2O$, $K_2O$). Gypsum ($CaSO_4$) is during milling of the clinker minerals added, normally in an amount of approximately 2–5% by weight calculated on said clinker minerals. A number of dissolution and hydration reactions occurs immediately after addition of water, which reaction not are known to their full extent and/or fully characterised. An initial heat emission emanating from reactions between tricalciumaluminate and gypsum occurs and results in deposition of ettringite ($Ca_6Al_2[(OH)_4SO4]_3.26\ H_2O$ or $3\ CaO.Al_2O_3.CaSO_4\ .32\ H_2O$) on the serface of the tricalciumaluminate. The ettringite is only stable as long as unreacted gypsum is present in the composition. The ettringite reacts, when all gypsum is consumed, further with unreacted tricalciumaluminate to yield the monosulphate $3\ CaO.Al_2O_3.CaSO_4.12\ H_2O$. The reaction between tricalciumaluminate and water is spontaneous with heavy heat emission. Yielded metastable hydrates are then transformed into stable hydrates. Gypsum is, in order to retard these rapid and undesirable reactions, admixed. Formed ettringite gives a protective layer on the surfaces of the tricalciumaluminate. Gypsum per se also partly retards hydration of the tricalciumaluminate.

Frequently used cement compositions wherein the dehydration shrinkage is controlled or adjusted by addition of gypsum also include aluminate cement having an aluminate content of 35–50% and mixtures of aluminate cement and Portland cement. The ratio added gypsum to cement is normally 1:2 to 1:3.

Admixture of gypsum into a cement composition having an unknown or poorly defined aluminate and/or gypsum content is thus a matter of delicate balancing of the ratio of aluminate to gypsum. The use of a shrinkage-reducing agent having a defined and invariable composition will substantially simplify admixture and reduce variations and problems as disclosed above.

Efforts have been made to change the cement composition per se in order reduce problems with shrinkage. It is also from a number of patents and patent applications, such as EP 308950, EP 573036, JP 48043010, JP 59128240 and JP 59131552, made known that alcohols, such as secondary and tertiary polyalcohols, alkanediols, acetylenic diols and polyvinyl alcohol, optionally in combination with surface active fluorocompound and/or a silica, have a certain performance as shrinkage-reducing agents in cement compositions. Alcohols are, furthermore, used as milling additives, which is disclosed in German patent application no. 3245843.

The present invention provides quite unexpectedly a shinkage-reducing agent having properties superior to known and used agents. The agent of the present invention is an acetal, preferably a cyclic acetal of a tri or polyhydric alcohol and it is unexpectedly shown that said acetals are superior to the alcohols from which they are yielded. The shrinkage-reducing agent according to the present invention exhibits a substantial shinkage-reduction compared to said alcohols as well as compared to a control without the agent of the invention and/or corresponding alcohol.

The agent according to the present invention is intended to be used in aqueous cement comprising compositions, such as a concrete, a hydraulic cement, a mortar, a screened, a sealant composition or the like. The agent comprises at least one acetal of a tri or polyhydric alcohol in an amount of 1–99%, such as 40–99% or 50–99% by weight. The acetal is in preferred embodiments a cyclic acetal comprising at least one 1,3-dioxa group, such as a formal, and having a water solubility of at least 0.2%, such as 0.5% or 1%. Especially preferred embodiments include formals having a 1,3-dioxane structure, such as 1,3-dioxanes of trihydric alcohols which suitably are selected from the group consisting of trimethylol $C_1$–$C_8$ alkanes. Said trimethylol $C_1$–$C_8$ alkanes can be exemplified by trimethylolethane and trimethylpropane. Further suitable tri and polyhydric alcohols are found in the group consisting glycerol, diglycerol, ditrimethylolethane, ditrimethylolpropane, pentaerythritol, dipentaerythritol. The most preferred acetals are derived from tri or polyhydric alcohols having neopentyl structure. Acetals of carboxyfunctional alcohols, such as the trifunctional dimethylolpropionic acid having one carboxyl group and two hydroxyl groups, can also be included in the agent of the present invention. This kind of acetals can be exemplified by the cyclic acetal 5-ethyl-1,3-dioxane-5-carboxylic acid yielded from reaction between dimethylolpropionic acid and formaldehyde. The acetal of the agent can also advantageously be an acetal, such as a cyclic formal, of an alkoxylated tri or polyfunctional alcohol. The alkoxylate is suitably prepared by reaction between said alcohol and an alkylene oxide, such as ethylene oxide and propylene oxide and in special cases butylene oxide or phenylethylene oxide as well as combinations of said alkylene oxides. Diacetals, triacetals tetraacetals, etc. of alcohols having four or more hydroxyl groups can also be included in embodiments of agent according to the present invention.

The agent of the present invention comprises in the most preferred embodiments at least one acetal of glycerol, trimethylolethane, trimethylolpropane or pentaerythritol, such as 4-hydroxymethyl- 1,3-dioxolane, 5-hydroxy- 1,3-dioxane, 5-methyl-5-hydroxymethyl-1,3-dioxane, 5-ethyl-5-hydroxymethyl-1,3-dioxane or 5,5-dihydroxymethyl- 1,3-dioxane.

Liquid acetals of tri or polyhydric alcohols can suitable and in accordance with the present invention be included in a powderous shrinkage-reducing agent. The agent is then produced by mixing a carrier comprising at least one powderous amorphous silica, such as a silicic acid, and said acetal. The percentage silica is suitably 1–50%, preferably 10–40%, by weight of the mixture.

Acetals are reaction products between at least one alcohol and at least one aldehyde and include cyclic acetals, such as 1,3-dioxolanes, 1,3-dioxanes and 1,3,5-trioxepanes. Acetal refers to an organic dialkoxycompound—Römpps Chemie-Lexikon 8. Aufl. 1981—and cyclic acetal accordingly to a cyclic dialkoxycompound. Acetals are inter alia formed during synthesis and/or recovery of di, tri or polyhydric alcohols, for instance when water and excess aldehyde, such as formaldehyde, is evaporated. Cyclic acetals are inter alia yielded when a 1,3-diol group in for instance a di, tri or polyhydric alcohol of neopentyl structure reacts with for example formaldehyde (formal= formaldehyde acetal) to give corresponding 1,3-dioxane. Cyclic acetals can also be obtained by direct reaction between said alcohol and an aldehyde. These reactions can be exemplified by 1,3-dioxolane (glycol formal) obtained when a mixture comprising formaldehyde, ethylene glycol and an acid catalyst is heated and by 1,3,5-trioxepane, a cyclic glycol formal having two oxymethylene units, obtained when 1,3-dioxolane, formaldehyde and an acidic catalyst is heated. Glycerol, trimethylolalkanes and pentaerythritols form when reacted with formaldehyde cyclic acetals (cyclic formals), such as 4-hydroxy(alkyl)- 1,3-dioxolanes, 5-hydroxy- 1,3-dioxane, 5-alkyl-5-hydroxy(alkyl)-1,3dioxanes, and 5,5-dihydroxy(alkyl)-1,3-dioxanes.

The present invention refers in a further aspect to the use of said shrinkage-reducing agent in aqueous cement comprising compositions, such as a concrete, a hydraulic cement, a mortar, a screened, a sealant composition or the like. The agent is preferably added to said composition in an amount of 0.1–20%, such as 2–5%, by weight calculated on dry cement included in said composition.

Without further elaboration, it is believed that one skilled in the art can, using the preceding description, utilise the present invention to its fullest extent. The following preferred specific, embodiments as shown in Examples 1–4, are, therefore, to be construed as merely illustrative and not limitative of the remainder of the disclosure in any way whatsoever.

Example 1: Preparation of an aqueous cement comprising composition according to EN 196–1. The composition is a control without shrinkage-reducing agent.

Example 2: Comparative example wherein trimethylolpropane is used as shrinkage-reducing agent.

Example 3: Addition of a shrinkage-reducing agent according to the present invention. The agent is of 5-ethyl-5-hydroxymethyl-1,3-dioxane.

Example 4: Preparation of a powderous shrinkage-reducing agent, according to the present invention, comprising 5-ethyl-5-hydroxymethyl-1,3-dioxane and an amorphous silica.

EXAMPLE 1 (Reference)

A cement based composition according to EN 196–1 was prepared in a Hobart mixer. The composition comprised 225 g of water, 450 g of standard Portland cement and 1350 g of CEN sand.

The cement was during 30 seconds and under stirring added to the water under stirring at speed 1 of the mixer. The sand was then during the following 30 seconds added and the stirring was at speed 2 allowed to continue for a further 150 minutes. The composition was now allowed to rest for 90 seconds and then stirred at speed 2 during 60 seconds. The total mixing/stirring time was 4 minutes.

Four sample bodies were after mixing casted in moulds and used for measurement of dehydration shrinkage. The dimensions of the bodies were 250 ×25×25 mm. The bodies were cured in air at 20° C. and 100% relative humidity and demoulded after 24 hours. An initial length value was after demoulding measured.

The sample bodies was then stored at 20° C. and 50% relative humidity. Measurement of the length was performed 21 and 49 days after the initial measurement.

Recorded dehydration shrinkage is given in Table (I) below.

| Storage, days | Shrinkage, ‰ |
| --- | --- |
| 21 | 0.805 |
| 49 | 0.937 |

EXAMPLE 2 (Comparative)

A composition in accordance with Example 1 was prepared using trimethylolpropane (TMP) as shrikage-reducing agent.

The shrinkage-reducing agent was added to the water in an amount corresponding to 1% and 3% by weight calculated on the cement.

Casting of sample bodies, storage and length measurement was carried out in accordance with Example 1.

Recorded dehydration shrinkage is given in Table (II) below.

| Storage, days | 1% TMP - Shrinkage, ‰ | 3% TMP - Shrinkage, ‰ |
| --- | --- | --- |
| 21 | 0.830 | 0.765 |
| 49 | 1.029 | 0.804 |

EXAMPLE 3

A composition in accordance with Example 1 was prepared using 5-ethyl-5-hydroxymethyl-1,3-dioxane as shrikage-reducing agent in accordance with the present invention.

The shrinkage-reducing agent was added to the water in an amount corresponding to 3% by weight calculated on the cement.

Casting of sample bodies, storage and length measurement was carried out in accordance with Example 1 with the difference that length measurements were performed after 21 and 70 days instead of 21 and 49 days.

Recorded dehydration shrinkage is given in Table (III) below.

| Storage, days | Shrinkage, ‰ |
|---|---|
| 21 | 0.529 |
| 70 | 0.602 |

EXAMPLE 4

A powderous shrinkage-reducing agent was prepared by mixing 70% by weight of 5-ethyl-5-hydroxymethyl-1,3-dioxane and 30% by weight of an amorphous silicic acid.

A composition in accordance with Example 1 was prepared using above shrinkage agent as shrikage-reducing agent. The shrinkage-reducing agent was added in an amount corresponding to 3% by weight of 5-ethyl-5-hydroxymethyl-1,3-dioxane calculated on the cement. Casting of sample bodies, storage and length measurement was carried out in accordance with Example 3.

Recorded dehydration shrinkage corresponds with results given in Table (III).

What is claimed is:

1. An aqueous cement composition comprising an additive providing reduced shrinkage, said additive comprising at least one cyclic acetal of a tri or polyhydric alcohol, said cyclic acetal having at least one 1, 3-dioxa group, and optionally at least one silica.

2. An aqueous cemenet composition in accordance with claim 1,wherein said cyclic acetal is a cyclic formal having a water solubility of at least 0.5%.

3. An aqueous cement composition in accordance with claim 1, wherein said cyclic acetal is a 1,3-dioxolane or 1,3-dioxane of a trihydric alcohol.

4. An aqueous cement composition in accordance with claim 3,wherein said trihydric alcohol is a trimethylol $C_1-C_8$ alkane.

5. An aqueous cement composition in accordance with claim 4, herein said trimethylol $C_1-C_8$ alkane is selected from the group consisting of trimethylolethane, trimethylolpropane and a mixture thereof.

6. An aqueous cement composition in accordance with claim 1, wherein said cyclic acetal is a 1,3-dioxolane or 1,3-dioxane of an alkoxylated trihydric alcohol.

7. An aqueous cement composition in accordance with claim 6, wherein said alkoxylated trihydric alcohol is a reaction product between at least one trihydric alcohol and at least one alkylene oxide.

8. An aqueous cement composition in accordance with claim 7, wherein said alkylene oxide is selected from the group consisting of ethylene oxide, propylene oxide and a mixture thereof.

9. An aqueous cement composition in accordance with claim 8, wherein said trihydric alcohol is a trimethylol $C_1-C_8$ alkane.

10. An aqueous cement composition in accordance with claim 9, wherein said trimethylol $C_1-C_8$ alkane is selected from the group consisting of trimethylolethane, trimethylolpropane and a mixture thereof.

11. An aqueous cement composition in accordance with claim 1, wherein said cyclic acetal is selected from the group consisting of a 4-hydroxyalkyl-1,3-dioxolane, a 5-alkyl-5-hydroxyalkyl-1,3-dioxane and a 5,5-dihydroxyalkyl-1,3-dioxane.

12. An aqueous cement composition in accordance with claims 1, wherein said cyclic acetal is selected from the group consisting of 4-hydroxymethyl-1,3-dioxolane, 5-hydroxy-1,3-dioxane, 5-ethyl-5-hydroxymethyl-1,3-dioxane and 5,5-dihydroxymethyl-1,3-dioxane.

13. An aqueous cement composition in accordance with claim 1, wherein said additive comprises 1–99% by weight of said cyclic acetal.

14. An aqueous cement composition in accordance with claim 1, wherein said additive comprises 40–99% by weight of said cyclic acetal.

15. An aqueous cement composition in accordance with claim 1, wherein said additive comprises 50–99% by weight of said cyclic acetal.

16. An aqueous cement composition in accordance with claim wherein said optional silica is a powder silica.

17. An aqueous cement composition in accordance with claim 1, wherein said optional silica is a silicic acid.

18. An aqueous cement composition in accordance with claim 16, wherein said silica is present in said additive in an amount of 1–50% by weight.

19. An aqueous cement composition in accordance with claim 17, wherein said silica is present in said additive in an amount of 1–50% by weight.

20. An aqueous cement composition in accordance with claim 16, wherein said silica is present in said additive in an amount of 10–40% by weight.

21. An aqueous cement composition in accordance with claim 17, wherein said silica is present in said additive in an amount of 10–40% by weight.

22. An aqueous cement composition in accordance with claim 1, wherein said aqueous cement composition comprises 0.1–20% by weight, calculated on dry cement, of said additive.

23. An aqueous cement composition in accordance with claim 1, wherein said aqueous cement composition comprises 1–10% by weight, calculated on dry cement, of said additive.

24. An aqueous cement composition in accordance with claim 1, wherein said aqueous cement composition comprises 2–5% by weight, calculated on dry cement, of said additive.

25. An aqueous cement composition in accordance with claim 1, wherein said aqueous cement composition is one selected from the group consisting of a concrete, a hydraulic cement, a screened, a mortar and a sealant composition.

26. An aqueous cement composition in accordance with claim 1, wherein said shrinkage is a dehydration shrinkage.

* * * * *